(12) United States Patent
Michels et al.

(10) Patent No.: US 11,448,275 B2
(45) Date of Patent: Sep. 20, 2022

(54) TECHNIQUE FOR OPERATING A VEHICLE BRAKE HAVING A HYDRAULIC SERVICE BRAKE AND AN ELECTRIC PARKING BRAKE

(71) Applicant: ZF Active Safety GmbH, Koblenz (DE)

(72) Inventors: Erwin Michels, Kail (DE); Benedikt Ohlig, Vallendar (DE); Michael Bast, Bendorf (DE); Matthias Fuchs, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 266 days.

(21) Appl. No.: 16/697,221

(22) Filed: Nov. 27, 2019

(65) Prior Publication Data
US 2020/0173508 A1 Jun. 4, 2020

(30) Foreign Application Priority Data
Nov. 29, 2018 (DE) .......................... 102018009372.8

(51) Int. Cl.
*F16D 65/18* (2006.01)
*B60T 13/74* (2006.01)
(Continued)

(52) U.S. Cl.
CPC ............ *F16D 65/183* (2013.01); *B60T 11/34* (2013.01); *B60T 13/741* (2013.01); *B60T 15/041* (2013.01); *B60T 15/043* (2013.01)

(58) Field of Classification Search
CPC ...... B60T 13/74; B60T 13/741; B60T 13/588; B60T 13/662; B60T 15/041;
(Continued)

(56) References Cited

U.S. PATENT DOCUMENTS 7,992,691 B2 * 8/2011 Maron ................... B60T 17/221
188/156
2014/0214296 A1 * 7/2014 Baehrle-Miller ..... B60T 13/588
701/70
(Continued)

FOREIGN PATENT DOCUMENTS

DE 102004004992 A1 9/2005
DE 102009014127 A1 6/2010
(Continued)

*Primary Examiner* — Thomas J Williams
(74) *Attorney, Agent, or Firm* — Robert James Harwood

(57) ABSTRACT

The present disclosure relates to a method for operating a vehicle brake. The vehicle brake includes a hydraulic service brake having an actuating piston, which for generating a first braking force component is movable, under the action of a hydraulic pressure, into an actuating position in which the actuating piston presses a friction lining against a rotatingly supported brake disc, and an electric parking brake, with an actuating element, that is designed to build up a second braking force component that acts on the brake disc. The method includes ascertaining the hydraulic pressure, determining a first braking force component, establishing a second braking force component to be set by means of the parking brake, based on the first braking force component and a desired total braking force, and establishing a position of the actuating element of the parking brake to be set.

9 Claims, 3 Drawing Sheets

(51) Int. Cl.
*B60T 15/04* (2006.01)
*B60T 11/34* (2006.01)

(58) Field of Classification Search
CPC .... B60T 15/043; B60T 17/221; F16D 65/183; F16D 55/226
See application file for complete search history.

(56) References Cited

U.S. PATENT DOCUMENTS

| | | | |
|---|---|---|---|
| 2015/0061365 A1* | 3/2015 | Sakashita | B60T 11/103 303/15 |
| 2016/0290425 A1* | 10/2016 | Baehrle-Miller | F16D 55/226 |
| 2020/0173508 A1* | 6/2020 | Michels | B60T 17/221 |

FOREIGN PATENT DOCUMENTS

| | | | | |
|---|---|---|---|---|
| DE | 102010002825 A1 | | 9/2011 | |
| DE | 102011016126 A1 | | 10/2012 | |
| DE | 102014212605 A1 | * | 12/2015 | ............. B60T 13/74 |
| DE | 102016213645 A1 | | 2/2018 | |
| DE | 102016213666 A1 | | 2/2018 | |
| DE | 102016010823 A1 | | 3/2018 | |
| EP | 1679453 A1 | * | 7/2006 | ................ B60T 8/00 |
| WO | WO-2012152350 A1 | * | 11/2012 | ................ B60T 8/17 |
| WO | WO-2018100489 A1 | * | 6/2018 | ................ B60T 8/17 |

* cited by examiner

TECHNIQUE FOR OPERATING A VEHICLE BRAKE HAVING A HYDRAULIC SERVICE BRAKE AND AN ELECTRIC PARKING BRAKE

CROSS-REFERENCE TO RELATED APPLICATION

This application claims priority to German Patent Application No. 10 2018 009 372.8, filed Nov. 29, 2019, the disclosure of which is incorporated herein by reference in its entirety.

TECHNICAL FIELD

The present disclosure relates, in general, to the technical field of vehicle brakes, and in particular to vehicle brakes that are equipped with a hydraulically operated service brake and an electric parking brake (also referred to as a parking brake). More precisely, the present disclosure relates to a method for fixing a position of an actuating element of the electric parking brake to be set, taking into account a desired total braking force of the vehicle brake. The present disclosure further relates to a vehicle brake having a control unit for carrying out such a method, a computer program product, and a control unit for same.

BACKGROUND

Vehicle brakes that include a hydraulic service brake as well as an electric parking brake are known and are widely used in vehicles. The hydraulic service brake includes an actuating piston which is displaceable under the action of a hydraulic pressure, and which, when an actuating position is assumed (i.e., in an actuated state of the service brake), typically is supported on a friction lining and presses it against a rotor of the vehicle brake, for example a brake disc. The hydraulic pressure may be built up under driver control, for example according to a pedal actuation. In addition, by means of additional electrohydraulic components it is known to build up the hydraulic pressure independently of a driver, at least partially, or to increase a pressure that is generated under driver control.

In addition to the service brake, it is also known to provide a parking brake that is designed to provide continuous braking forces, in particular when the vehicle, at least temporarily, assumes a stationary state (parked state, starting on a hill, etc.). For this purpose, the parking brake may generally be designed to hold the actuating piston in a brake force-generating position, even after the hydraulic pressure has decreased, and preferably mechanically secure it. Examples of such approaches are found in DE 101 50 803 B4 and DE 10 2004 004992 A1.

In present electric parking brakes, a minimum tension force resulting from regulatory requirements (see FMVSS 135 and ECE-R13H), for example, is set for holding a vehicle. Due to inaccuracies of the mechanical components that are necessary for generating the tension force, and in the associated power and control electronics systems, in practice the minimum tension force is intentionally greatly exceeded (for example, using an offset value or a safety factor greater than 1).

In conjunction with the present approach of estimating the tension force by detecting the motor current of the electric parking brake, the vehicle brake is thus subjected to more tension force than is actually necessary. In addition, a braking force component of the parking brake is hydraulically superimposed with a hydraulic braking force component due to a driver foot force component and/or a corresponding boost.

SUMMARY

A method for operating a vehicle brake as well as a vehicle brake are provided, which avoid the above-described problems with known vehicle brakes. In particular, an object of the present disclosure is to provide a technique via which a desired total braking force of a vehicle brake may be reliably set, even when a hydraulic pressure is present, without subjecting the vehicle brake to excessive stress.

According to a first aspect, a method for operating a vehicle brake is provided. The vehicle brake includes a hydraulic service brake having an actuating piston, which for generating a first braking force component, is movable, under the action of a hydraulic pressure, into an actuating position in which the actuating piston presses a friction lining against a rotatingly supported brake disc, and an electric parking brake that is designed to build up a second braking force component that acts on the brake disc, in that an actuating element of the parking brake is supported on the actuating piston in order to press the friction lining against the brake disc. The method includes the following steps: ascertaining the hydraulic pressure, determining a first braking force component based on the hydraulic pressure, establishing a second braking force component to be set by means of the parking brake, based on the first braking force component and a desired total braking force, and establishing a position of the actuating element of the parking brake to be set, based on the second braking force component and a rigidity of the vehicle brake.

The service brake and the parking brake may be designed according to known principles, at least from a hydraulic and mechanical standpoint. In particular, as stated above, the electric parking brake may be an electromechanical parking brake. The actuating element may be a spindle nut of a nut/spindle arrangement of the parking brake. The desired total braking force may be a minimum braking force for holding the vehicle at a standstill, as stipulated by regulatory requirements (FMVSS 135 and ECE-R13H, for example). A safety offset may be added to this minimum braking force, and/or it may be multiplied by a safety factor greater than 1.

The position of the actuating element to be set may be defined, for example, by a position of the actuating element in relation to a reference point of the vehicle brake which remains stationary during the actuation of the parking brake and during the actuation of the service brake (for example, a housing of the vehicle brake). Alternatively or additionally, the position of the actuating element to be set may be defined in relation to a starting position of the actuating element, for example by a predetermined number of revolutions of a drive motor that drives the actuating element, or by a predetermined number of revolutions of a spindle on which the actuating element as a spindle nut moves.

Rigidity is a variable in engineering mechanics which describes the resistance of a body (in this case, the entire vehicle brake) against elastic deformation by a force or a torque. In the present case, this force may at least encompass the force that is exerted by a motor that drives the actuating element of the parking brake. Accordingly, the torque of this motor (which acts on a spindle for moving the actuating element) may also be considered. The overall rigidity of the vehicle brake, which is primarily under consideration here, is composed of rigidities of individual components of the vehicle brake, wherein the rigidity of the friction lining has significant influence on the overall rigidity. Since the friction lining is subject to continual abrasion as well as aging effects, the rigidity of the friction lining, and thus the overall rigidity of the vehicle brake, changes over the course of the operating period of the vehicle brake.

The rigidity of the vehicle brake utilized for the method for fixing the position of the actuating element to be set may be read out from a memory of a control unit of the vehicle brake. The stored value of the rigidity may be determined and updated at regular intervals or even upon each actuation of the parking brake, as described below.

The method may also include tensioning of the parking brake for generating the second braking force component by moving the actuating element into the fixed position. When the actuating element is in the fixed position after tensioning of the parking brake, it may be ensured that the desired total braking force is set (provided that the first braking force component remains constant). The actuating element may be moved into the fixed position, for example taking into account a predetermined number of revolutions of a drive motor that drives the actuating element, or a predetermined number of revolutions of a spindle on which the actuating element as a spindle nut moves.

The hydraulic pressure may be ascertained by measuring the hydraulic pressure. For measuring the hydraulic pressure, a suitable pressure sensor may be used which is in contact with a hydraulic fluid that acts on the actuating piston. The pressure sensor may be situated within the vehicle brake, or also in some other area of a hydraulic system of the vehicle. As an alternative to measuring the hydraulic pressure, for example a force with which a driver of the vehicle actuates a pedal of the vehicle brake may be measured. Based on this force and known boosting behavior of a hydraulic pressure booster, the hydraulic pressure may then be ascertained.

The first braking force component may be determined as the product of the hydraulic pressure and a pressure surface area of the actuating piston. The pressure surface area of the actuating piston is specified by its geometry, and may be assumed to be known. The pressure surface area may, for example, be stored as a fixed value in a memory of a control unit of the vehicle brake. The pressure surface area may have been determined, for example, by calibration measurements, wherein the built-up first braking force component is measured as a function of the hydraulic pressure and determined from the ratio of these two values of the pressure surface area. The position of the actuating element to be set may be fixed based on an actuating travel of the actuating element. The actuating travel may be calculated as the quotient of the second braking force component and the rigidity.

The actuating travel may be a path covered by the actuating element (expressed as motor revolutions or spindle revolutions, for example), starting from a so-called support point of the parking brake. This support point is defined by the fact that after the parking brake reaches the support point, a braking force is built up by pressing the actuating element against the actuating piston, which in turn presses the friction lining against the brake disc. Upon reaching the support point, the parking brake is thus within a load range. The support point may be recognized and fixed, for example, by the fact that (during tensioning of the parking brake) beginning at this point, an operating parameter of the parking brake (for example, the motor current of the driven motor) exceeds a predetermined threshold value. The corresponding reverse behavior occurs when the parking brake is released. Details concerning options for determining the position of the support point may be found in the document DE 10 2016 010 823 A1. More precisely, within the scope of the method, according to the first aspect, a support point of the parking brake may be determined as described in the document DE 10 2016 010 823 A1.

Since the rigidity of the vehicle brake is typically determined only within the load range of the parking brake, i.e., after the support point has been reached, and thus while a braking force is actually being built up in particular by the parking brake, the actuating travel may be a path of the actuating element covered within the load range of the parking brake, starting at the support point. Within the load range, the behavior of the rigidity is similar to a spring constant, and is thus definable as $C=Fmech/s$, where $C$ is the rigidity, Fmech is the second braking force component of the parking brake, and s is the actuating travel. Thus, when the rigidity $C$ is known and the second braking force component Fmech is fixed, the actuating travel s, and with a known position of the support point, the position to be set, may be established. Other definitions and/or determinations of the dispute [sic; rigidity] $C$ are possible.

The method may also include ascertaining the rigidity of the vehicle brake, the ascertainment of the rigidity comprising detection of the actuating travel covered during the actuation of the parking brake as a function of a detected actuating force. The rigidity may be ascertained as described in the document DE 10 2011 016 126 A1, for example. The rigidity may thus be ascertained, using the parking brake, as the ratio of the detected actuating force to the actuating travel covered. The rigidity may be ascertained within the load range of the parking brake, i.e., in a range after the support point in which the parking brake exerts a braking force or a braking force component.

The actuating travel may be determined by detecting an operating parameter (an engine speed, for example) of a drive motor of the parking brake or by means of a path sensor. The actuating travel may be defined starting from the support point, or starting from some other predetermined point within the load range. The actuating travel may be detected, for example, during tensioning of the parking brake beginning at a point in time after which the detected actuating force has exceeded a predetermined threshold value.

The actuating force may be determined by detecting an operating parameter (a motor current, for example) of a drive motor of the parking brake or by means of a force sensor. In addition, an actuating pressure may also be detected by a pressure sensor and converted into an actuating force in a known manner. In accordance with DE 197 32 168 C1, the motor current may be determined using a motor current sensor which detects the motor current at the drive motor that is necessary for the actuating operation. The motor current consumption of the drive motor is proportional to the applied actuating force. A capacitive, piezoelectric, or resistive force sensor may also be provided. The force sensor may be situated in the hydraulic piston or directly at the brake caliper. Instead of a force sensor, a pressure sensor (in the hydraulic piston, for example) may be implemented for determining the actuating pressure.

The rigidity may be redetermined upon each actuation or after reaching a predefined number of actuations of the parking brake, and stored. A value for the rigidity may be stored, for example, in a memory of a control unit of the vehicle brake, and updated after each actuation of the parking brake, and thus, after each determination of the rigidity. When the rigidity is constantly updated, the method presented here may continuously respond to changes in the rigidity resulting, for example, from wear of the friction lining.

According to a second aspect, a vehicle brake is presented. The vehicle brake includes a hydraulic service brake having an actuating piston, which for generating a first braking force component, is movable, under the action of a hydraulic pressure, into an actuating position in which the actuating piston presses a friction lining against a rotatingly supported brake disc, and an electric parking brake that is designed to build up a second braking force component that acts on the brake disc, in that an actuating element of the parking brake is supported on the actuating piston in order to press the friction lining against the brake disc. The vehicle brake also includes a control unit that is configured to cause the vehicle brake to carry out a method having the steps according to at least the first aspect.

All of the embodiments of the method described above and discussed below with regard to the first aspect may be applied to the vehicle brake of the second aspect. In other words, the vehicle brake may be configured to implement all of the details of the first aspect described above and discussed below. More precisely, the control unit of the vehicle brake may be configured to control the vehicle brake in such a way that one or more of the method steps described above and discussed below with regard to the first aspect is/are carried out. The brake disc is not necessarily the subject matter of the vehicle brake according to the second aspect, although the description of the second aspect refers to the brake disc for explanation of the features of the second aspect.

According to a third aspect, a computer program product is provided. The computer program product includes program code means which, when the computer program product is executed on a processor, carries out a method having the steps according to the first aspect. All of the embodiments of the method described above with regard to the first aspect may be applied to the computer program product of the third aspect.

According to a fourth aspect, a control unit is provided. The control unit includes a processor and the computer program product according to the third aspect.

BRIEF DESCRIPTION OF THE DRAWINGS

Further advantages and features of the present disclosure will become apparent from the following description and the accompanying drawings, to which reference is made. In which are shown.

DETAILED DESCRIPTION

Figure 1:
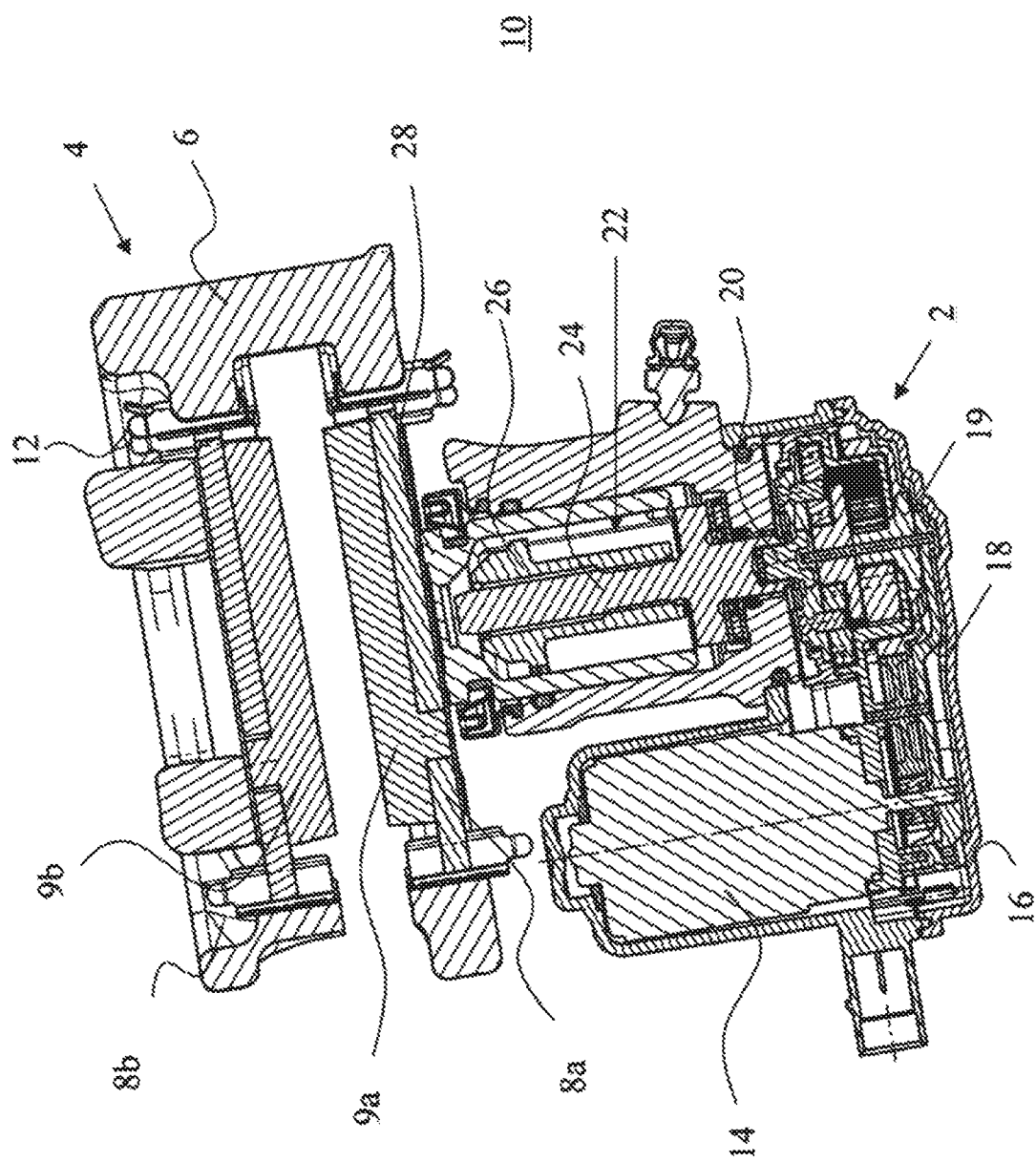
FIG. 1 shows a cross section of a vehicle brake according to one exemplary embodiment.

FIG. 1 shows a cross section of a vehicle brake (or wheel brake) 10 of a vehicle braking system according to one exemplary embodiment of the present disclosure. The wheel brake 10 includes an electromechanical brake actuator 2 of a parking brake and a U-shaped brake caliper 4 for accommodating a brake disc. The brake disc is not illustrated in FIG. 1. The brake caliper 4 has a shim 6 and a first and second back plate 8a, 8b for accommodating a brake lining or friction lining 9a, 9b, respectively. The brake linings 9a, 9b are in frictional contact with the brake disc when the wheel brake 10 is actuated.

The brake caliper 4 is mechanically coupled via the first back plate 8a to a hydraulic piston (or actuating piston) 28, which upon actuation of the wheel brake 10 is axially moved in the direction of the first back plate 8a in order to press the brake lining 9a, situated at the first back plate 8a, against the brake disc. During a service braking operation, the hydraulic piston 28 is hydraulically moved by a hydraulic pressure that is generated in the vehicle braking system by a driver (and optionally boosted), or electrohydraulically generated, while during a parking braking operation or upon activation of the hill start assist function, the hydraulic piston 28 is mechanically moved with the aid of an actuating member 22 of the electromechanical brake actuator 2.

The electromechanical brake actuator 2 includes a drive motor 14 for generating a torque, a gear unit 18 that is coupled to a drive shaft 16 of the drive motor 14, an output-side journal 20 connected downstream from the gear unit 18, and the actuating member 22, which is coupled to the output-side journal 20.

The gear unit 18 connected downstream from the drive motor 14, is designed as a multistage reduction gear unit for providing a high reduction ratio, and thus, a high actuating force, at the wheel brake 10. In the present embodiment, the gear unit 18 includes, for example, a two-stage planetary gear 19 for transmitting the generated torque to the output-side journal 20. The output-side journal 20 transmits the rotary motion to the actuating member 22, which is designed as a spindle gear having a spindle 24 and a spindle carrier (or spindle nut) 26. The spindle gear 22 converts the rotary motion, output at the output-side journal 20, into a linear motion in a known manner, the spindle carrier 26 being translationally moved in the direction of the brake caliper 4.

The translational motion of the spindle carrier 26 is transmitted to the first back plate 8a via the hydraulic piston 28. In addition, the motion of the spindle carrier 26 is transmitted to the second back plate 8b via a deflection device 12. In this way, the actuating member 22 generates a tensioning force or a tensioning pressure at the brake disc which is a function, on the one hand of the path covered by the actuating member 22 (more precisely, the spindle carrier 26), and on the other hand, of the rigidity of the wheel brake 10. The spindle carrier 26 thus acts as an actuating element of the parking brake.

The rigidity, which describes the deformation resistance (compression resistance) of the wheel brake 10 when an actuating force is applied, is a function of the individual components of the wheel brake 10, i.e., of the rigidity of the brake disc, the brake linings 9a, 9b, the back plates 8a, 8b, the housing, and the actuating member 22. Since the components comprising the actuating member 22, the back plates 8a, 8b, the brake disc, and the housing, designed as metal parts, are significantly more rigid than the brake linings 9a, 9b, the overall rigidity of the wheel brake 10 is determined essentially by the rigidity of the brake linings 9a, 9b.

Figure 2:
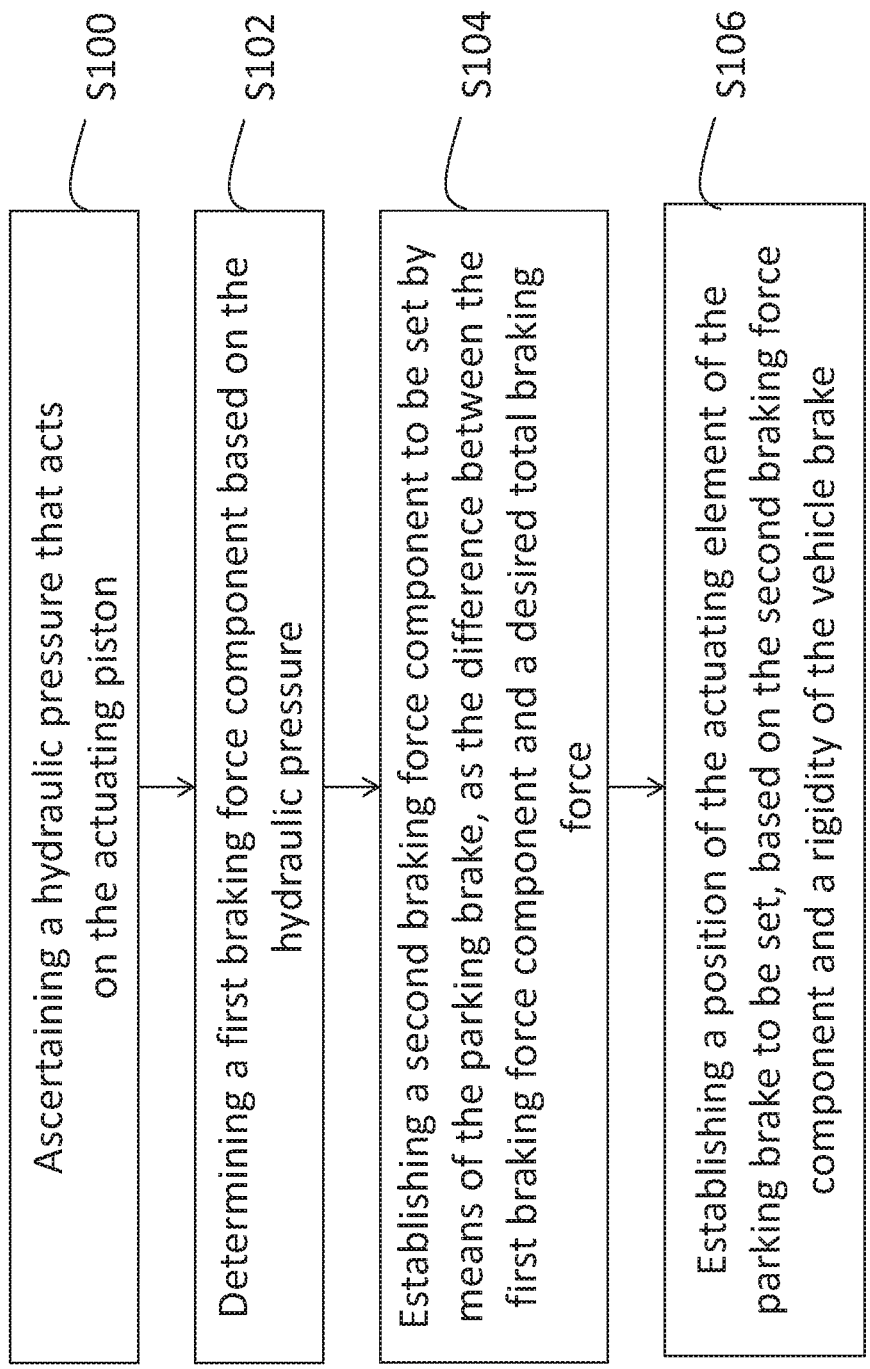
FIG. 2 shows a flow chart of a method according to one exemplary embodiment, wherein the method may be carried out with the vehicle brake according to FIG. 1.

With reference to FIG. 2, a method is described below concerning how a total braking force may be exerted on the brake disc with the aid of the vehicle brake 10, wherein the total braking force corresponds as exactly as possible to, for example, a regulatory stipulation for a setpoint total braking force (or minimum braking force) during a parking braking operation. The method finds application in particular when a hydraulic pressure is already present, i.e., when the driver of the vehicle actuates the brake pedal of the service brake, or when a corresponding hydraulic pressure has been built up autonomously, prompted by a control unit of the vehicle brake 10, by means of an electric brake pressure generator.

In addition to the components illustrated in FIG. 1, the vehicle brake 10 includes a control unit (not illustrated) which controls the vehicle brake 10. This may be, for example, a control unit of the overall vehicle braking system, and in particular a central control unit of the vehicle. The control unit is configured to carry out the steps described below, and more precisely, to control the vehicle brake 10 for carrying out the following steps. For this purpose, the control unit has a processor and a memory, wherein commands are stored in the memory which prompt the processor to carry out the steps described below.

A prevailing hydraulic pressure that acts on the actuating piston 28 is initially ascertained in step S100. The hydraulic pressure is measured with a pressure sensor, which is situated either in the vehicle brake 10 itself or in some other area of the vehicle braking system, for example at the output of a master cylinder. The vehicle may be at a standstill. At the same time, the driver may actuate the brake pedal in order to hold the vehicle at a standstill. Alternatively, at a standstill the hydraulic pressure may be generated in conjunction with hill start assist or some other assistance function, using an electric hydraulic pressure generator (for example, a pump that is actuatable by an electric motor).

In step S102 a first braking force component is determined, based on the hydraulic pressure ascertained in step S100. The first braking force component is a hydraulic braking force component, i.e., a braking force component, that is brought about solely by the hydraulic service brake, and not by the (optionally not yet activated) parking brake.

The first braking force component (hydraulic braking force component) may be determined from the linear relationship of the pressure force and the pressure surface area, using the following formula: $F_{hyd}=p*A$, where $F_{hyd}$ is the first braking force component, p is the hydraulic pressure, and A is the pressure surface area. The pressure surface area A is specified by the geometry of the vehicle brake 10, and more precisely, by the geometry of the hydraulic piston 28. The pressure surface area A is stored as a known value in a memory of the control unit of the vehicle brake 10. The pressure surface area A has been ascertained, for example, in a (one-time, for example) calibration process, with the generated braking force component $F_{hyd}$ being measured as a function of the applied hydraulic pressure p.

A second braking force component to be set by means of the electric parking brake is subsequently established in step S104. More precisely, this second braking force component is ascertained based on the first braking force component and a desired total braking force, for example by forming a difference according to the following formula: $F_{mech}=F_{total}-F_{hyd}$, where $F_{mech}$ is the (mechanical) second braking force component, $F_{total}$ is the desired total braking force, and $F_{hyd}$ is the (hydraulic) first braking force component.

The desired total braking force $F_{total}$ is a braking force intended to act as a whole on the brake disc (and that is intended to be maintained, optionally after reducing the hydraulic pressure by means of the parking brake). Accordingly, the vehicle brake 10 attempts to attain this total braking force. The total braking force $F_{total}$ is, for example, a predefined value that is stored in a memory of the control unit of the vehicle brake 10. The total braking force $F_{total}$ may correspond to a total braking force (minimum braking force) that is stipulated by regulatory requirements, optionally a safety offset having been added to the regulatory total braking force, and/or it having been multiplied by a safety factor greater than 1.

A position of the actuating element 26 to be set is ascertained in step S106. This takes place based on the previously established second braking force component $F_{mech}$ and a rigidity C of the vehicle brake 10. More precisely, this takes place based on the formula $s=F_{mech}/C$, where s is the actuating travel, $F_{mech}$ is the second braking force component, and C is the rigidity.

The rigidity C of the vehicle brake 10 is stored in the memory of the control unit of the vehicle brake 10, and has been determined beforehand by measurement. More precisely, the measurement of the rigidity C may be carried out as described in the document DE 10 2011 016 126 A1. Details concerning measurement of the rigidity C are also explained below in conjunction with FIGS. 3*a* and 3*b*. In addition, the rigidity C may be redetermined by measurement upon each actuation of the parking brake (or after a number of actuations predefined here), and subsequently updated in the memory of the control unit.

The position of the actuating element 26 is determined based on the actuating travel s. In other words, the position of the actuating element 26 may be expressed as the actuating travel s. The actuating travel s may be defined as the path covered by the actuating element 26 after reaching the so-called support point. In other words, the actuating travel s is the path covered by the actuating element 26 along the spindle 24 within the load range, i.e., when a (mechanical) braking force is exerted on the brake disc. The support point is thus defined as a state of the parking brake, upon which (during tensioning of the parking brake) the parking brake begins to press the friction linings 9*a*, 9*b* against the brake disc, and thus exert a braking force on the brake disc. This support point may be determined by monitoring an operating parameter, in particular the motor current of the drive motor 14, for example by determining the position of the actuating element 26 in which the motor current increases above a predetermined threshold value. Details concerning an option for determining the position of the support point may be found in the document DE 10 2016 010 823 A1.

In a further step not illustrated in FIG. 2, tensioning of the parking brake for generating the second braking force component may take place via a corresponding motion of the actuating element 26. The actuating element 26 is hereby moved into the position that has been fixed in step S106. Subsequent to the tensioning of the parking brake, the hydraulic pressure, and thus the first braking force component, may be reduced, by the driver or automatically. The previously set total braking force $F_{total}$ is then mechanically maintained by means of the parking brake.

Figure 3B:
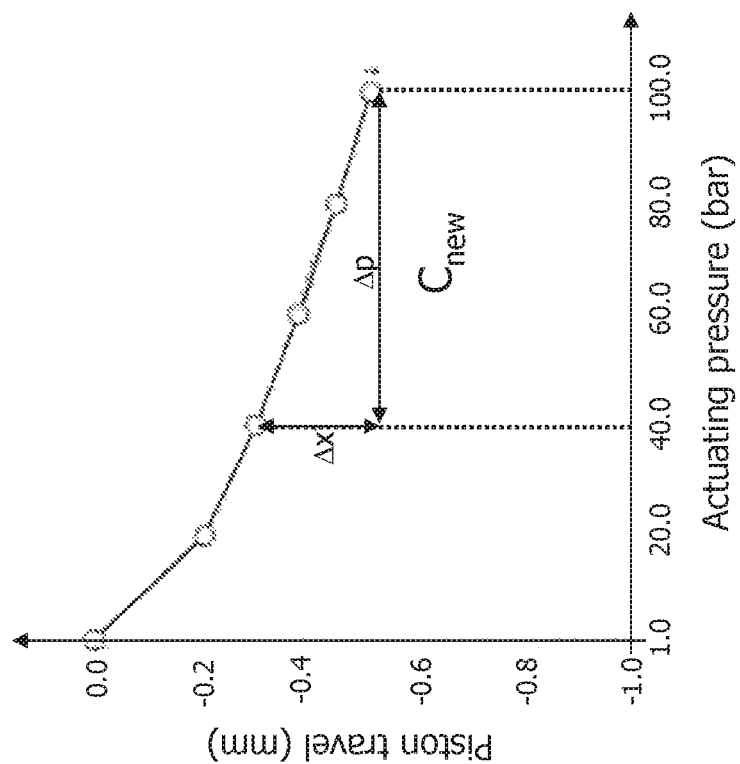
FIG. 3b shows a second path-pressure diagram for an actuating element of the parking brake of the vehicle brake according to FIG. 1.
Figure 3A:
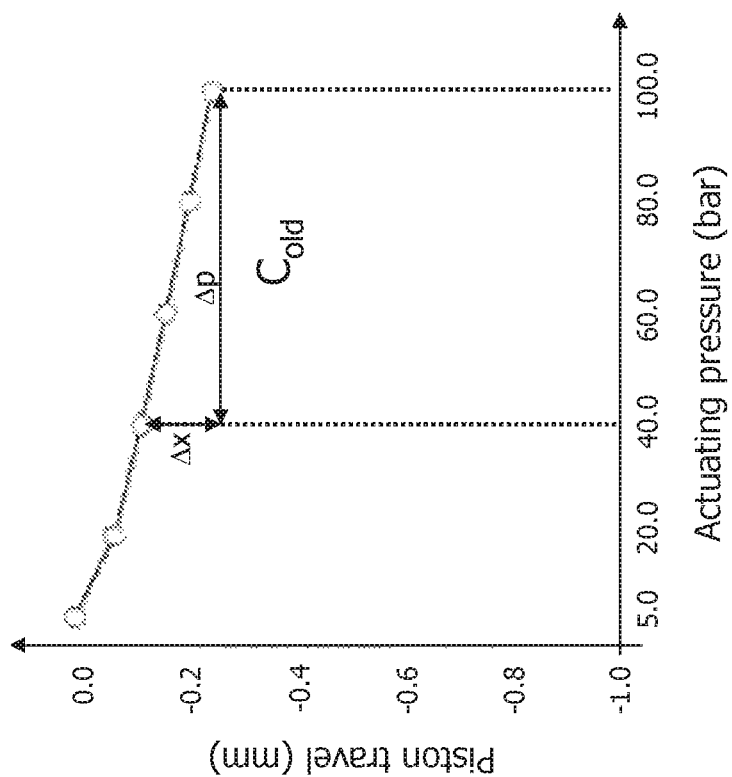
FIG. 3a shows a first path-pressure diagram for an actuating element of the parking brake of the vehicle brake according to FIG. 1.

One option is provided below, with reference to FIGS. 3*a* and 3*b*, for determining the rigidity C, more precisely the overall rigidity, of the vehicle brake 10 by measurement. FIG. 3*a* shows the actuating travel (piston travel of the hydraulic piston 28) detected during an actuation of the electromechanical brake actuator 2, as a function of the detected actuating pressure for an example of a wheel brake 10 without a brake lining 9*a*, 9*b* (for example, due to a completely worn state). In comparison, FIG. 3*b* shows the profile of the piston travel as a function of the detected actuating pressure for a wheel brake 10 having a brake lining 9*a*, 9*b*; for ease of comparison, the actuating travel for small actuating pressures has been set to zero for both path-pressure diagrams. It is not important that in the present exemplary embodiment, the actuating pressure is detected instead of the actuating force, and in FIGS. 3a and 3b the profile of the piston travel is illustrated as a function of the detected actuating pressure, since the actuating pressure is directly proportional to the generated actuating force. The actuating force may be ascertained from the actuating pressure and the known hydraulic piston surface area. Alternatively, instead of the actuating pressure, the actuating force may be determined directly from the motor current consumption of the drive motor 14.

The comparison of the curves illustrated in FIGS. 3a and 3b clearly shows the influence of the brake lining 9a, 9b on the relationship between the piston travel covered on the one hand, and the piston pressure thus generated on the other hand. For example, for the wheel brake 10 without the brake lining 9a, 9b, a translational motion of the actuating member 22, more precisely, of the actuating element 26, of approximately 0.1 mm allows the piston pressure to increase from 40 bar to 100 bar, while for this same change in pressure, for the wheel brake 10 with an unworn brake lining 9a, 9b a piston travel of approximately 0.2 mm is necessary. The wheel brake 10 with the unworn brake lining 9a, 9b is more highly deformable than the wheel brake 10 without the brake lining 9a, 9b. In other words, the wheel brake 10 without the brake lining 9a, 9b has a higher deformation resistance (rigidity (C)) compared to the wheel brake 10 having the brake lining 9a, 9b, by a factor of 2.

The rigidity ($C_{old}$, $C_{new}$) of the wheel brake 10 is determined by selecting in each case at least two corresponding measured values for the piston travel and the actuating pressure (or actuating force) from the set of measured values detected in succession, and by difference formation, determining the change in the actuating pressure $\Delta p$ (or equivalently, the change in the actuating force $\Delta F$) as a function of the change in the piston travel $\Delta x$ (see FIG. 3). Detected measured values that correspond to an actuating pressure or a motor current consumption of the drive motor 14 are converted into corresponding actuating force values. The rigidity $C_{old}$, $C_{new}$ then results from the quotient $\Delta F/\Delta x$. Based on the above example, it is clear that for a known rigidity C of the parking brake and with a predefined second force component Fmech, the actuating travel s to be covered may be determined.

By use of the method described herein, the actual (wear-dependent) rigidity C of the vehicle brake 10 may be ascertained for setting the second (mechanical) force component Fmech in order to attain a predefined total force in combination with a first (hydraulic) force component Fhyd that is present. Since the rigidity C, which may be determined by measurement, is taken into account, the total force Ftotal may be precisely set, continuously and independently of wear, without the need for adding too large of a safety offset to the prescribed total force. Stress on the parking brake and the vehicle brake 10 as a whole may thus be reduced.

What is claimed is:

1. A method for operating a vehicle brake, wherein the vehicle brake comprises:
   a hydraulic service brake having an actuating piston, which for generating a first braking force component, is movable, under the action of a hydraulic pressure, into an actuating position in which the actuating piston presses a friction lining against a rotatingly supported brake disc, and
   an electric parking brake that is designed to build up a second braking force component that acts on the brake disc, in that an actuating element of the parking brake is supported on the actuating piston in order to press the friction lining against the brake disc,
   wherein the method comprises the following steps:
   ascertaining the hydraulic pressure;
   determining a first braking force component based on the ascertained hydraulic pressure;
   establishing a second braking force component to be set by means of the parking brake, based on the first braking force component and a desired total braking force; and
   establishing a fixed position of the actuating element of the parking brake to be set calculated as the quotient of the second braking force component and a rigidity of the vehicle brake.

2. The method according to claim 1, further comprising: tensioning the parking brake for generating the second braking force component by moving the actuating element into the fixed position.

3. The method according to claim 1, wherein the hydraulic pressure is ascertained by measuring the hydraulic pressure.

4. The method according to claim 1, wherein the first braking force component is determined as the product of the hydraulic pressure and a pressure surface area of the actuating piston.

5. A method for operating a vehicle brake, wherein the vehicle brake comprises:
   a hydraulic service brake having an actuating piston, which for generating a first braking force component, is movable, under the action of a hydraulic pressure, into an actuating position in which the actuating piston presses a friction lining against a rotatingly supported brake disc, and
   an electric parking brake that is designed to build up a second braking force component that acts on the brake disc, in that an actuating element of the parking brake is supported on the actuating piston in order to press the friction lining against the brake disc, wherein the method comprises the following steps:
   ascertaining the hydraulic pressure;
   determining a first braking force component based on the ascertained hydraulic pressure;
   establishing a second braking force component to be set by means of the parking brake, based on the first braking force component and a desired total braking force;
   ascertaining a rigidity of the vehicle brake by detecting an actuating travel covered during the actuation of the parking brake as a function of a detected actuating force; and
   establishing a position of the actuating element of the parking brake to be set based on the second braking force component and the rigidity of the vehicle brake.

6. The method according to claim 5, wherein the actuating travel is determined by detecting an operating parameter of a drive motor of the parking brake or by means of a path sensor.

7. The method according to claim 5, wherein the actuating force is determined by detecting an operating parameter of the drive motor of the parking brake or by means of a force sensor.

8. The method according claim 5, wherein the rigidity is redetermined and stored upon each actuation or after reaching a predefined number of actuations of the parking brake.

9. A vehicle brake, comprising:
   a hydraulic service brake having an actuating piston, which for generating a first braking force component, is movable, under the action of a hydraulic pressure, into an actuating position in which the actuating piston presses a friction lining against a rotatingly supported brake disc, and an electric parking brake that is designed to build up a second braking force component that acts on the brake disc, in that an actuating element of the parking brake is supported on the actuating piston in order to press the friction lining against the brake disc, wherein the vehicle brake is configured to ascertain the hydraulic pressure, determine a first braking force component based on the ascertained hydraulic pressure, establish a second braking force component to be set by means of the parking brake, based on the first braking force component and a desired total braking force, and establish a fixed position of the actuating element of the parking brake to be set calculated as the quotient of the second braking force component and a rigidity of the vehicle brake.

* * * * *